(12) United States Patent
Fusari et al.

(10) Patent No.: US 8,191,456 B2
(45) Date of Patent: Jun. 5, 2012

(54) METHOD OF DRIVING AN HYDRAULIC ACTUATOR BY MEANS OF A PRESSURE CONTROLLED PROPORTIONING SOLENOID VALVE

(75) Inventors: Alessandro Fusari, Cremona (IT); Paolo Machetto, Cirie' (IT); Roberto Ragazzi, Turin (IT)

(73) Assignee: Magneti Marelli Powertrain S.p.A., Corbetti (IT)

( * ) Notice: Subject to any disclaimer, the term of this patent is extended or adjusted under 35 U.S.C. 154(b) by 861 days.

(21) Appl. No.: 12/292,792

(22) Filed: Nov. 26, 2008

(65) Prior Publication Data

US 2009/0173220 A1   Jul. 9, 2009

(30) Foreign Application Priority Data

Nov. 28, 2007   (EP) ..................... 07425752

(51) Int. Cl.
*F15B 9/09* (2006.01)
*F15B 13/044* (2006.01)
(52) U.S. Cl. .............. 91/363 R; 91/361; 91/459; 91/465
(58) Field of Classification Search ............ 91/361, 91/363 R, 367, 459, 462, 465
See application file for complete search history.

(56) References Cited

U.S. PATENT DOCUMENTS 5,737,992 A * 4/1998 Torrekens et al. ............ 91/361
7,210,394 B2 * 5/2007 Yajima et ...................... 91/361

FOREIGN PATENT DOCUMENTS

| EP | 0802356 | 10/1997 |
| EP | 0933564 | 8/1999 |
| EP | 1055847 | 11/2000 |
| EP | 1270954 | 1/2003 |
| EP | 1722133 | 11/2006 |
| GB | 2379721 | 3/2003 |

OTHER PUBLICATIONS

European Search Report mailed May 25, 2008 in European Appln. No. 07425752.8.

* cited by examiner

*Primary Examiner* — Michael Leslie
(74) *Attorney, Agent, or Firm* — Davidson Berquist Jackson & Gowdey, LLP

(57) ABSTRACT

A method of driving a hydraulic actuator provided with a pressure-controlled proportioning solenoid valve; the method includes the steps of: determining a first open-loop contribution according to a pressurized oil flow rate which crosses the proportioning solenoid valve and according to the desired load pressure inside the actuation chamber; determining a second open-loop contribution according to the desired position of the spool of the proportioning solenoid valve; determining a third closed-loop contribution according to the difference between a desired value of the position of the mobile piston and a real value of the position of the mobile piston; and calculating a desired electric driving current value of the proportioning solenoid valve by means of an algebraic sum of the three contributions.

13 Claims, 4 Drawing Sheets

METHOD OF DRIVING AN HYDRAULIC ACTUATOR BY MEANS OF A PRESSURE CONTROLLED PROPORTIONING SOLENOID VALVE

TECHNICAL FIELD

The present invention relates to a method of driving a hydraulic actuator by means of a pressure-controlled proportioning solenoid valve.

The present invention is advantageously applied to the driving of a hydraulic actuator of a servo-assisted mechanical transmission, to which explicit reference will be made in the description which follows without therefore loosing in generality.

BACKGROUND ART

Servo-assisted mechanical transmissions, which are structurally similar to a manual mechanical transmission of the traditional type except for the fact that the clutch pedal and the gear selection lever operated by the driver are replaced by corresponding electric or hydraulic servo-controls, are increasingly widespread.

Generally, the clutch servo-control is of the hydraulic type and comprises a single hydraulic actuator for displacing the clutch from the closing position to the opening position and vice versa. Generally, the gearbox servo-control is also of the hydraulic type and acts on a gearbox control shaft to impress on the control shaft itself both an axial displacement, i.e. along a central axis, and a rotation about the central axis; the two movements of the control shaft are necessary to engage and disengage each gear and to select the range of gears to be engaged. Consequently, the gearbox servo-control comprises a first hydraulic actuator mechanically coupled to the control shaft to axially displace the control shaft and a second hydraulic actuator mechanically coupled to the control shaft to rotate the control shaft.

Each hydraulic actuator comprises at least one actuation chamber delimited on one side by a mobile piston, which slides along the actuation chamber itself and is mechanically connected to the control shaft. Furthermore, for each actuation chamber, the hydraulic actuator comprises at least one three-way solenoid valve which drives the hydraulic actuator and which is adapted either to connect the actuation chamber to a hydraulic accumulator containing pressurized oil, or to connect the actuation chamber to a discharge tank containing oil at atmospheric pressure, or to maintain the actuation chamber isolated.

Normally, the hydraulic actuator which controls the gear engagement/disengagement is driven by using a pressure-controlled proportioning solenoid valve, which allows to very accurately control the force which is developed by the hydraulic actuator and applied to the control shaft (the oil pressure inside the actuation chamber is directly proportional to the force developed by the hydraulic actuator); indeed, in the engagement/disengagement of the gears it is essential for the hydraulic actuator to develop a force suitable for overcoming the mechanical resistances, otherwise the gears cannot be engaged/disengaged and the control shaft does not move. However, with a pressure-controlled proportioning solenoid valve it is not possible to accurately control the instantaneous position of the control shaft actuated by the hydraulic actuator and therefore positioning errors of the control shaft, which cause undesired noise, may easily occur. In order to accurately control the instantaneous position of the control shaft actuated by the hydraulic actuator, a flow-controlled proportioning valve should be used (the amount of oil inside the actuation chamber is directly proportional to the position of the hydraulic actuator); however, by using a flow-controlled proportioning solenoid valve it is not possible to accurately control the force which is developed by the hydraulic actuator and thus it is not possible to guarantee that the force which is developed by the hydraulic actuator is sufficient to engage/disengage the gears.

DISCLOSURE OF INVENTION

It is the object of the present invention to provide a method of driving a hydraulic actuator by means of a pressure-controlled proportioning valve, such a driving method being free from the above-described drawbacks and, specifically, being easy and cost-effective to implement.

According to the present invention a method of driving a hydraulic actuator by means of a pressure-controlled proportioning solenoid valve is provided as claimed in the attached claims.

BRIEF DESCRIPTION OF THE DRAWINGS

The present invention will now be described with reference to the accompanying drawings, which disclose a non-limitative embodiment thereof, in which.

PREFERRED EMBODIMENTS OF THE INVENTION

Figure 1:
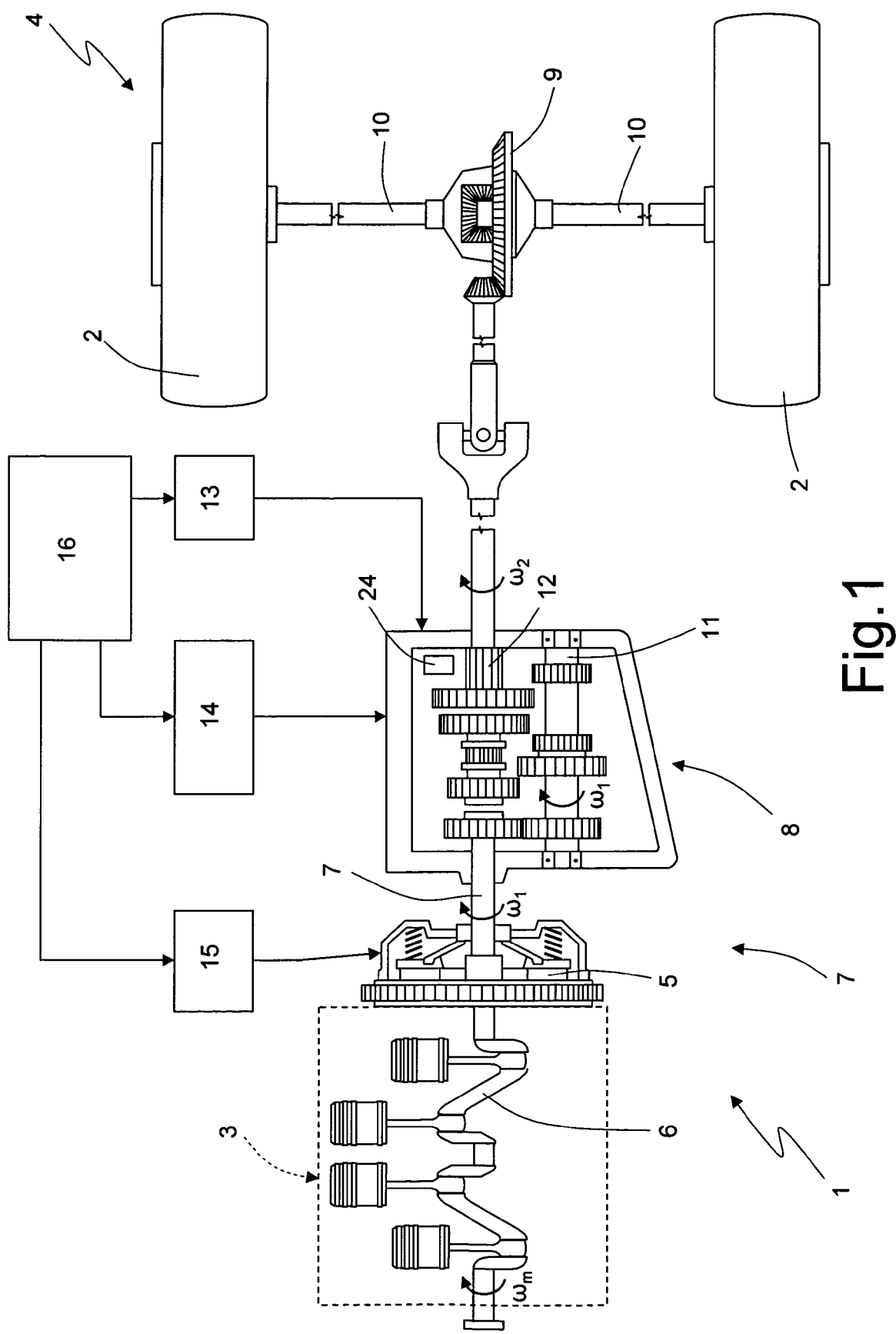
FIG. 1 is a diagrammatic view of a vehicle provided with a servo-assisted mechanical transmission.

In FIG. 1, numeral 1 indicates as a whole a car provided with two front wheels (not shown) and two rear drive wheels 2 which receive the torque generated by an internal combustion engine 3 by means of a servo-assisted transmission 4. The servo-assisted transmission 4 comprises a servo-assisted clutch 5, which is accommodated in a bell integral with the engine 3 and is adapted to connect a drive shaft 6 of the engine 3 to a propeller shaft 7 ending in a servo-assisted mechanical gearbox 8. A differential 9, from where a pair of axle shafts 10 departs, each of which is integral with a corresponding rear drive wheel 2, is arranged in cascade to the servo-assisted gearbox 8.

The servo-assisted gearbox 8 comprises a primary shaft 11, which rotates at an angular speed $\omega_1$, and a secondary shaft 12, which rotates at an angular speed $\omega_2$ and transmits the motion to the rear drive wheels 2 by means of the differential 9 and the pair of axle shafts 10. The servo-assisted gearbox 8 is actuated by a hydraulic actuator 13 to engage/disengage a gear and by a hydraulic actuator 14 to select the gear range. By means of the interposition of the servo-assisted clutch 5, which is operated by a hydraulic actuator 15, the primary shaft 11 is connected to the drive shaft 6, which is rotated by the engine 3 and rotates at an angular speed $\omega_m$.

The car 1 comprises an electronic control unit 16 (diagrammatically shown), which controls the servo-assisted transmission 4 and, among other tasks, drives the hydraulic actuators 13 and 14 of the servo-assisted gearbox 8 and the hydraulic actuator 15 of the servo-assisted clutch 5.

Figure 2:
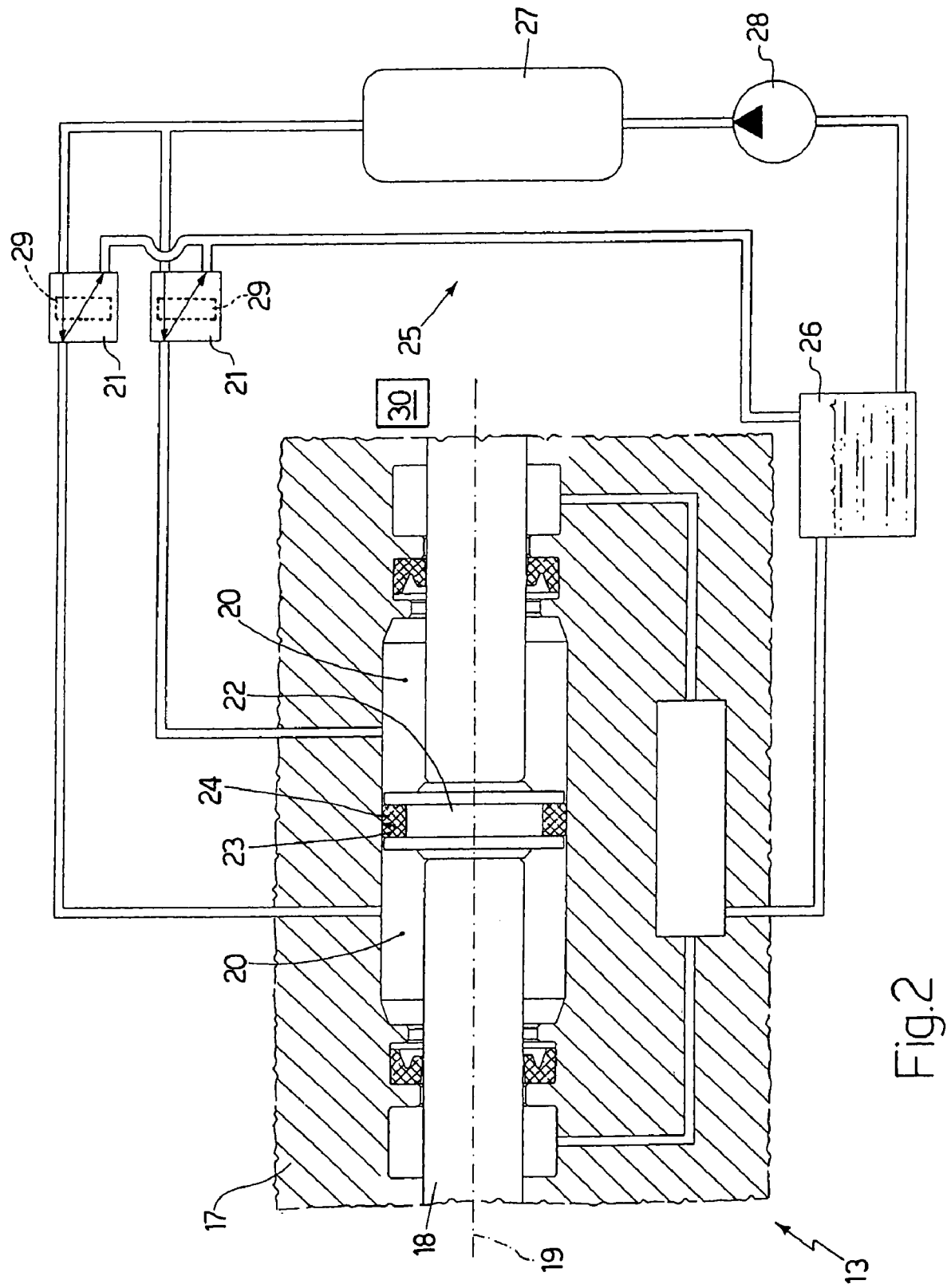
FIG. 2 is a diagrammatic section view with parts removed for clarity of a part of the hydraulic actuator of the servo-assisted mechanical transmission in FIG. 1 which is driven according to the present invention.

As shown in FIG. 2, the hydraulic actuator is obtained in a supporting body 17 and controls the engagement and the disengagement of the gears by impressing an axial displacement, i.e. along a central axis 19, to a control shaft 18. Specifically, the hydraulic actuator 13 is arranged at an intermediate portion of the control shaft 18 and has two actuation chambers 20, which are obtained in the supporting body 17 and are alternatively filled with pressurized oil (which constitutes a control fluid of the hydraulic actuator 13) so as to axially displace the control shaft 18 in the two directions under the control of a pair of three-way solenoid valves 21 driven by the electronic control unit 16. Specifically, the two actuation chambers 20 are crossed by the control shaft 18, are arranged in series along the control shaft 18, and are reciprocally separated by a flange 22, which is integral with the control shaft 18; the flange 22 defines a piston of the hydraulic actuator 13, such a piston being slidingly mobile within the actuation chamber 20. The flange 22 comprises a central ring-shaped cavity 23 which accommodates a ring-shaped seal 24.

The solenoid valves 21 are hydraulically connected to a hydraulic circuit 25, which is in common for the hydraulic actuators 13, 14 and 15. The hydraulic circuit 25 comprises a tank 26 containing the oil at atmospheric pressure, a hydraulic accumulator 27 containing the pressurized oil, and a pump 28 which draws from the tank 26 and feeds the hydraulic accumulator 27. Each three-way solenoid valve 21 is capable of maintaining the corresponding actuation chamber 20 isolated in order to maintain the oil pressure in the actuation chamber 20 constant, is capable of connecting the actuation chamber 20 to the tank 26 in order to reduce the pressure of the oil in the actuation chamber 20, and is adapted to connect the actuation chamber 20 to the hydraulic accumulator 27 in order to increase the pressure of the oil in the actuation chamber 20.

Each solenoid valve 21 comprises a spool 29, which is axially displaced to three different positions (corresponding to the actuation chamber 20 connected to the tank 26, to the isolated actuation chamber 20, and to the actuation chamber 20 connected to the hydraulic accumulator 27) by means of an electromagnetic actuator. Each solenoid valve 21 is of the pressure-controlled proportioning type; in other words, the solenoid valve 21 is made so that the axial position of the spool 29 is proportional to the oil pressure downstream of the solenoid valve 21 (i.e. inside the corresponding actuation chamber 20).

Finally, the hydraulic actuator 13 comprises a position sensor 30, which is coupled to the control shaft 18 to detect the instantaneous position of the control shaft 18 itself and is connected to the electronic control unit 16 in order to send the reading of the position of the control shaft 18 to the electronic control unit 16 itself.

The electronic control unit 16 electrically supplies each solenoid valve 21 to make a direct electric driving current having variable intensity in time circulate through the solenoid valve 21 itself; specifically, for each solenoid valve 21 the electronic control unit 16 determines a desired electric driving current value $I_{TOT}$ of the proportioning solenoid valve 21 and thus supplies the proportioning solenoid valve 21 itself with an electric driving current having the desired $I_{TOT}$ value.

Figure 3:
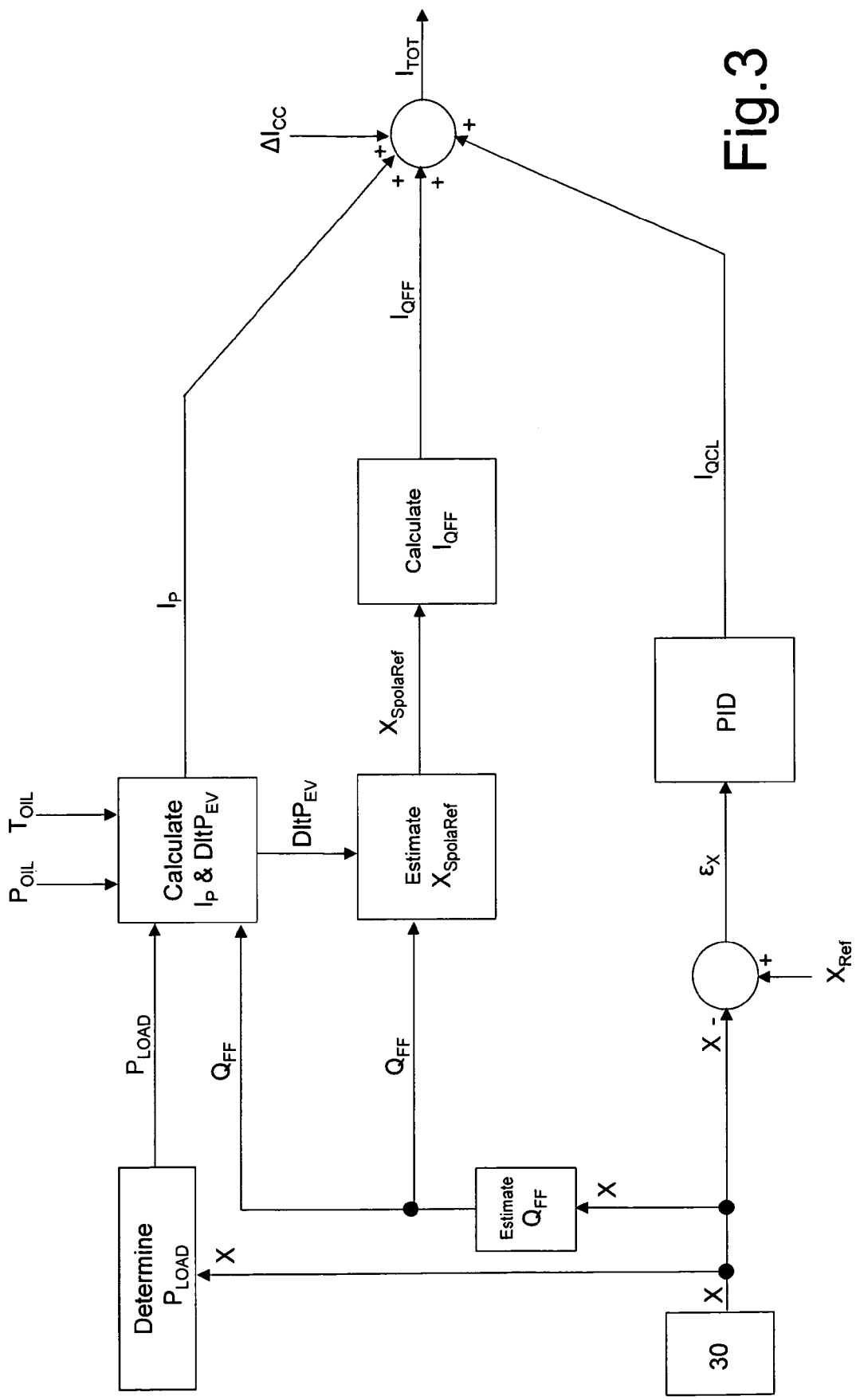
FIG. 3 is a block diagram of a driving logic of the hydraulic actuator in FIG. 2.

According to the block diagram shown in FIG. 3, the desired electric driving current value $I_{TOT}$ of each proportioning solenoid valve 21 is calculated by obtaining the algebraic sum of four contributions: one open-loop contribution $I_P$, one open-loop contribution $I_{QFF}$, one closed-loop contribution $I_{QCL}$ and one contribution $\Delta I_{CC}$.

In order to determine the open-loop contribution $I_P$ and the open-loop contribution $I_{QFF}$, the pressurized oil flow rate $Q_{FF}$ which crosses the proportioning solenoid valve 21 is preventively estimated according to the speed of the mobile piston 22 provided (indirectly) by the position sensor 30 and according to the section of the actuation chamber 20, which is a design datum known a priori. In other words, the pressurized oil flow rate $Q_{FF}$ which crosses the proportioning solenoid valve 21 is essentially equal to the volume variation in the unit of time of the actuation chamber 20 and is thus equal to the speed of the mobile piston 22 (i.e. to the variation in the unit of time of the position X of the mobile piston 22, i.e. of the first derivative in time of the position X of the mobile piston 22) multiplied by the section of the actuation chamber 20.

In order to determine the open-loop contribution $I_P$ the force which must be developed by the hydraulic actuator 13 to perform the required engagement/disengagement operation must also be preventively calculated; generally, the force which must be developed by the hydraulic actuator 13 is not constant but varies according to the position X of the mobile piston 22 of the hydraulic actuator 13. According to the force which must be developed by the hydraulic actuator 13, the desired load pressure $P_{load}$ inside the actuation chamber 20 is thus determined (again according to the position X of the mobile piston 22 of the hydraulic actuator 13) by means of a simple division; indeed, the desired load pressure $P_{load}$ inside the actuation chamber 20 is equal to the force which must be developed by the hydraulic actuator 13 divided by the area of the mobile piston 22, which is a design datum known a priori. In other words, as shown in FIG. 3, the desired load pressure $P_{load}$ inside the actuation chamber 20 is determined according to the position X of the mobile piston 22 of the hydraulic actuator 13; generally, during the step of designing and regulating the system, an experimental table is determined which provides the corresponding desired load pressure $P_{load}$ according to the position X of the mobile piston 22.

Figure 4:
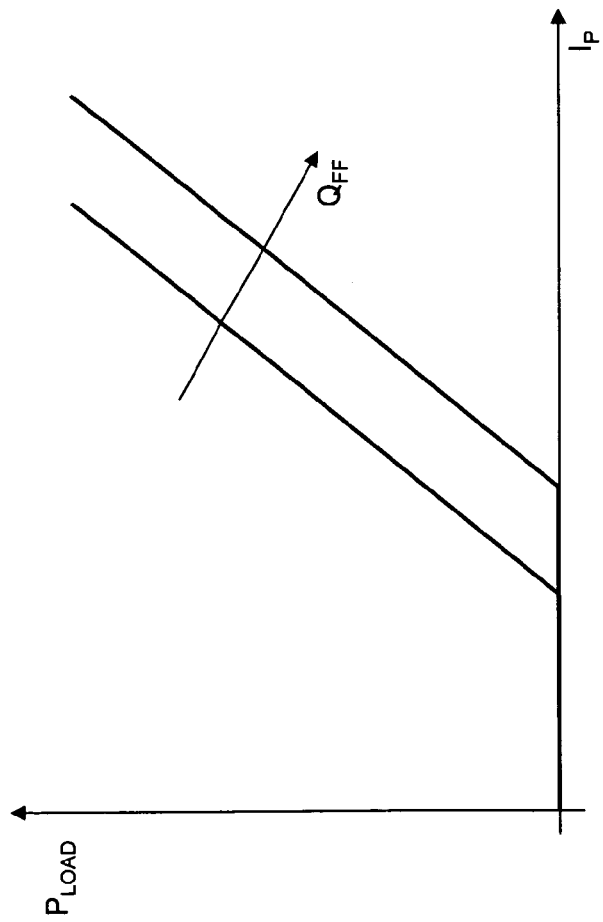

The open-loop contribution $I_P$ is determined according to the pressurized oil flow rate $Q_{FF}$ which crosses the proportioning solenoid valve 21 and according to the desired load pressure $P_{load}$ inside the actuation chamber 20. According to a preferred embodiment, the open-loop contribution $I_P$ is determined also according to the oil pressure $P_{OIL}$ upstream of the proportioning solenoid valve 21 and according to the oil temperature $T_{OIL}$ upstream of the proportioning solenoid valve 21. The oil pressure $P_{OIL}$ and the temperature $T_{OIL}$ upstream of the proportioning solenoid valve 21 (i.e. inside the hydraulic accumulator 27) may be either measured by means of corresponding sensors or estimated by means of known estimation techniques. Specifically, the open-loop contribution $I_P$ is determined by using the static feature of the proportioning solenoid valve 21 which is determined during the step of designing and regulating the system; normally, an experimental table is determined which, according to the desired load pressure $P_{load}$ in the actuation chamber 20 and to the pressurized oil flow rate $Q_{FF}$ which crosses the proportioning solenoid valve 21, provides the corresponding open-loop contribution $I_P$, which is parameterized according to the oil pressure $P_{OIL}$ and to the temperature $T_{OIL}$ upstream of the proportioning solenoid valve 21. By way of example, FIG. 4 diagrammatically shows an experimental curve which provides the corresponding loop contribution $I_P$ according to the desired load pressure $P_{load}$ inside the actuation chamber 20 and to the pressurized oil flow rate $Q_{FF}$ which crosses the proportioning solenoid valve 21.

Furthermore, a pressure drop $DltP_{EV}$ through the proportioning solenoid valve 21 is estimated according to the pressurized oil flow rate $Q_{FF}$ which crosses the proportioning solenoid valve 21, according to the oil pressure $P_{OIL}$ upstream of the proportioning solenoid valve 21 and according to the oil temperature $T_{OIL}$ upstream of the proportioning solenoid valve 21. Preferably, during the step of designing and regulating the system, an experimental table is determined, which provides the pressure drop $DltP_{EV}$ through the proportioning solenoid valve 21 according to the pressurized oil flow rate $Q_{FF}$ which crosses the proportioning solenoid valve 21, and is parameterized according to the oil pressure $P_{OIL}$ upstream of the proportioning solenoid valve 21 and according to the oil temperature $T_{OIL}$ upstream of the proportioning solenoid valve 21.

A desired position $X_{SpoolRef}$ of the spool 29 of the proportioning solenoid valve 21 is estimated according to the pressure drop $DltP_{EV}$ through the proportioning solenoid valve 21 and according to the pressurized oil flow rate $Q_{FF}$ which crosses the proportioning solenoid valve 21. Specifically, a flow area $K_A$ is determined initially according to the pressure drop $DltP_{EV}$ through the proportioning solenoid valve 21 and according to the pressurized oil flow rate $Q_{FF}$ which crosses the proportioning solenoid valve 21 and the desired position $X_{SpoolRef}$ of the spool 29 of the proportioning solenoid valve 21 according to the flow area $K_A$ is thus determined.

The following equation is used to determine the flow area $K_A$:

$$K_A = Q_{FF}^2 / DltP_{EV}$$

$K_A$ flow area;
$Q_{FF}$ pressurized oil flow rate which crosses the proportioning solenoid valve 21;
$DltP_{EV}$ pressure drop through the proportioning solenoid valve 21.

Figure 5:
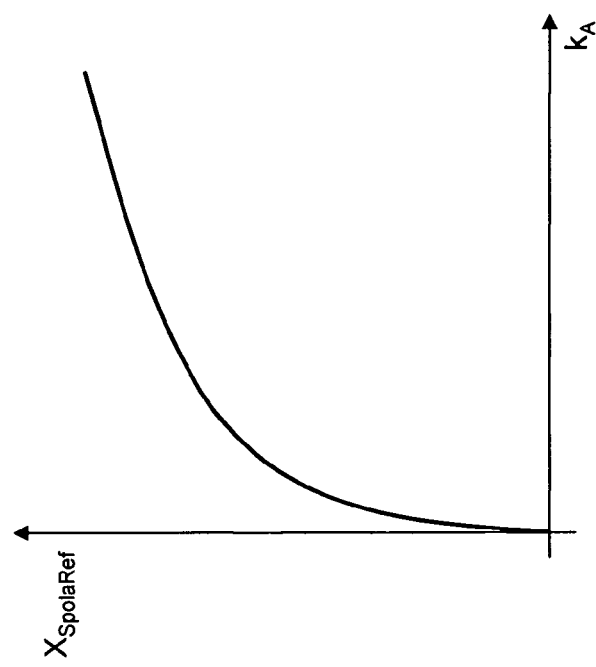
FIGS. 4 and 5 are graphs of two features used by the driving logic of the hydraulic actuator in FIG. 2.

During the step of design and regulating the system an experimental table is determined, which provides the desired position $X_{SpoolRef}$ of the spool 29 of the proportioning solenoid valve 21 according to the flow area $K_A$. By way of example, FIG. 5 diagrammatically shows an experimental curve which according to the flow area $K_A$ provides the corresponding desired position $X_{SpoolRef}$ of the spool 29 of the proportioning solenoid valve 21.

The open-loop contribution $I_{OFF}$ is determined according to the desired position $X_{SpoolRef}$ of the spool 29 of the proportioning solenoid valve 21; specifically, the open-loop contribution $I_{OFF}$ is proportional to the desired position $X_{SpoolRef}$ of the spool 29 of the proportioning solenoid valve 21. During the step of designing and regulating the system, either an experimental table may be determined which provides the open-loop contribution $I_{OFF}$ according to the desired position $X_{SpoolRef}$ of the spool 29 of the proportioning solenoid valve 21, or an experimental multiplying coefficient may be determined which, multiplied by the desired position $X_{SpoolRef}$ of the spool 29 of the proportioning solenoid valve 21, provides the open-loop contribution $I_{OFF}$.

The closed-loop contribution $I_{QCL}$ is determined according to the difference $\epsilon_X$ (i.e. the position error) between a desired value $X_{REF}$ of the position of the mobile piston 22 and the real value X of the position of the mobile piston 22 supplied by the position sensor 30; preferably, the closed-loop contribution $I_{QCL}$ is determined by using a PID regulator to process the difference $\epsilon_X$ between the desired value $X_{REF}$ of the position of the mobile piston 22 and the real value X of the position of the mobile piston 22.

The contribution $\Delta I_{CC}$ depends on the closed centre current and is essentially a calibration factor which compensates the constructive tolerances of the system and is experimentally determined in a known manner during the step of regulating the system itself.

It is important to observe that the three contributions $I_P$, $I_{QFF}$ and $I_{QCL}$ may have reciprocally different weights in determining the desired electric driving current value $I_{TOT}$ of a proportioning solenoid valve 21. For example, the open-loop contribution $I_P$ which depends on the desired load pressure $P_{load}$ in the actuation chamber 20 could have a greater weight (importance), i.e. could constitute most of the desired electric driving current value $I_{TOT}$; in this manner, it is guaranteed that the desired load pressure $P_{load}$ (i.e. the force generated by the hydraulic actuator 12) is tracked with minor deviations. In other words, by attributing different weights to the three contributions $I_P$, $I_{QFF}$ and $I_{QCL}$ it is possible to privilege the tracking of the desired load pressure $P_{load}$ (i.e. the force generated by the hydraulic actuator 12) with respect to the tracking of the desired position of the mobile piston 22.

According to a standard control method, a force which is developed by the hydraulic actuator 13 is determined, and thus the desired load pressure $P_{load}$ in the actuation chamber 20 is determined according to the force which must be developed by the hydraulic actuator 13, and thus the desired electric driving current value $I_{TOT}$ of the proportioning solenoid valve 21 is determined solely according to the desired load pressure $P_{load}$ in the actuation chamber 20. As previously mentioned, by operating in this manner, the force developed by the hydraulic actuator 13 is guaranteed always equal to the desired value (i.e. the success of the engagement/disengagement operation is guaranteed), but on the other hand the position of the mobile piston 22 (i.e. of the control shaft 18) is not accurately controlled and thus positioning errors of the control shaft which cause undesired noise may easily occur.

Instead, the above-described method of driving the hydraulic actuator 13 by determining the desired electric driving current value $I_{TOT}$ of the proportioning solenoid valve 21 does take only the desired pressure value $P_{load}$ inside the actuation chamber 20 into account, but also takes the position and the speed of the mobile piston 22 (i.e. of the control shaft 18) into account; in this manner, the above-described method of driving the hydraulic actuator 13 allows to control the force generated by the hydraulic actuator 13 with extreme accuracy and the position of the hydraulic actuator 13 itself with good accuracy.

The above-described method of driving the hydraulic actuator 13 has many advantages because it is simple and cost-effective to implement not requiring the installation of additional components with respect to those already normally present in a servo-assisted transmission and, above all, allows to control the force generated by the hydraulic actuator 13 with extreme accuracy and the position of the hydraulic actuator 13 itself with good accuracy. In this manner, it is possible to guarantee both the gear engagement/disengagement operation (by guaranteeing that the hydraulic actuator 13 always generates the necessary force), and the absence of undesired noise (by guaranteeing that the hydraulic actuator 13 never takes itself to anomalous positions).

Upon the several advantages of the above-described driving method, such a driving method may also be used in other applications different from the engagement/disengagement of a gear in a servo-assisted gearbox in which it is necessary to control both the force generated by the hydraulic actuator 13 and the position of the hydraulic actuator 13 itself.

The invention claimed is:
1. A method of driving a hydraulic actuator comprising:
at least one actuation chamber;
a mobile piston which slides inside an actuation chamber; and
a pressure-controlled proportioning solenoid valve for connecting the actuation chamber to a hydraulic accu- mulator containing a pressurized control oil and to a tank containing a control oil at atmospheric pressure;

the method comprising the steps of:

determining a force which must be developed by the hydraulic actuator;

determining a desired load pressure ($P_{load}$) inside the actuation chamber according to the force which must be developed by the hydraulic actuator;

determining a desired electric current driving value ($I_{TOT}$) of the proportioning solenoid valve according to the desired load pressure ($P_{load}$) inside the actuation chamber; and supplying the proportioning solenoid valve with an electric driving current having the desired value ($I_{TOT}$);

estimating a pressurized oil flow rate ($Q_{FF}$) which crosses the proportioning solenoid valve;

determining a first open-loop contribution ($I_P$) according to the pressurized oil flow rate ($Q_{FF}$) which crosses the proportioning solenoid valve and according to the desired load pressure ($P_{load}$) inside the actuation chamber;

estimating a pressure drop ($DltP_{EV}$) through the proportioning solenoid valve;

estimating a desired position ($X_{SpoolRef}$) of the spool of the proportioning solenoid valve according to the pressure drop ($DltP_{EV}$) through the proportioning solenoid valve and according to the pressurized oil flow rate ($Q_{FF}$) which crosses the proportioning solenoid valve;

determining a second open-loop contribution ($I_{QFF}$) according to the desired position ($X_{SpoolRef}$) of the spool of the proportioning solenoid valve;

determining a third closed-loop contribution ($I_{QCL}$) according to the difference ($\epsilon_X$) between a desired value ($X_{REF}$) of the position of the mobile piston and a real value (X) of the position of the mobile piston; and calculating the desired electric driving current value ($I_{TOT}$) by means of an algebraic sum of the three contributions ($I_P$, $I_{QFF}$, $I_{QCL}$).

2. A driving method according to claim 1 and comprising the further step of determining the third closed-loop contribution ($I_{QCL}$) by using a PID regulator to process the difference ($\epsilon_X$) between the desired value ($X_{REF}$) of the position of the mobile piston and the real value (X) of the position of the mobile piston.

3. A driving method according to claim 1 and comprising the further step of estimating the pressure drop ($DltP_{EV}$) through the proportioning solenoid valve (21) according to the pressurized oil flow rate ($Q_{FF}$) which crosses the proportioning solenoid valve and according to a pressure ($P_{OIL}$) upstream of the proportioning solenoid valve.

4. A driving method according to claim 3 and comprising the further step of determining an experimental table, which provides the pressure drop ($DltP_{EV}$) through the proportioning solenoid valve according to the pressurized oil flow rate ($Q_{FF}$) which crosses the proportioning solenoid valve, and is parameterized according to the oil pressure ($P_{OIL}$) upstream of the proportioning solenoid valve and according to an oil temperature ($T_{OIL}$) upstream of the proportioning solenoid valve.

5. A driving method according to claim 1 and comprising the further step of calculating the pressurized oil flow rate ($Q_{FF}$) which crosses the proportioning solenoid valve according to the speed of the mobile piston and according to the section of the actuation chamber.

6. A driving method according to claim 1 and comprising the further step of determining the first open-loop contribution ($I_P$) according to the pressurized oil flow rate ($Q_{FF}$) which crosses the proportioning solenoid valve, according to the load pressure ($P_{load}$) inside the actuation chamber, according to an oil pressure ($P_{OIL}$) upstream of the proportioning solenoid valve, and according to an oil temperature ($T_{OIL}$) upstream of the proportioning solenoid valve.

7. A driving method according to claim 1, wherein the step of estimating the desired position ($X_{SpoolRef}$) of the spool of the proportioning solenoid valve comprises the further steps of:

determining a flow area ($K_A$) according to the pressure drop ($DltP_{EV}$) through the proportioning solenoid valve and according to the pressurized oil flow rate ($Q_{FF}$) which crosses the proportioning solenoid valve; and determining the desired position ($X_{SpoolRef}$) of the spool of the proportioning solenoid valve according to the flow area ($K_A$).

8. A driving method according to claim 7 and comprising the further step of using the following equation for determining the flow area ($K_A$):

$$K_A = Q_{FF}^2 / DltP_{EV}$$

$K_A$ flow area;

$Q_{FF}$ pressurized oil flow rate which crosses the proportioning solenoid valve;

$DltP_{EV}$ pressure drop through the proportioning solenoid valve.

9. A driving method according to claim 7 and comprising the further step of determining an experimental table, which provides the desired position ($X_{SpoolRef}$) of the spool of the proportioning solenoid valve according to the flow area ($K_A$).

10. A driving method according to claim 1 and comprising the further steps of:

determining a fourth contribution ($\Delta I_{CC}$) which depends on a closed centre current; and calculating the desired electric driving current value ($I_{TOT}$) by means of an algebraic sum of the four contributions ($I_P$, $I_{QFF}$, $I_{QCL}$, $\Delta I_{CC}$).

11. A driving method according to claim 1 and comprising the further step of determining the desired load pressure ($P_{load}$) according to the position of the mobile piston.

12. A driving method according to claim 1, wherein the real value (X) of the position of the mobile piston is provided by a position sensor mechanically coupled to the mobile piston itself.

13. A driving method according to claim 1, wherein the piston of the hydraulic actuator is mechanically connected to a control shaft of a mechanical servo-assisted gearbox to impress to the control shaft a movement which determines the engagement or disengagement of a gear.

* * * * *